United States Patent [19]

Busso

[11] 4,077,272
[45] Mar. 7, 1978

[54] DEVICE FOR THE AUTOMATIC REGULATION OF THE TENSION OF A CRENELLATED TIMING BELT

[75] Inventor: Giuseppe Busso, Milan, Italy

[73] Assignee: Alfa Romeo S.p.A., Milan, Italy

[21] Appl. No.: 711,505

[22] Filed: Aug. 3, 1976

[30] Foreign Application Priority Data

Aug. 7, 1975 Italy ................... 26189/75

[51] Int. Cl.² ............................................. F16H 7/12
[52] U.S. Cl. ....................... 74/242.1 FP; 74/242.11 C
[58] Field of Search ............... 74/242.1 FP, 242.15 R, 74/242.11 C

[56] References Cited

U.S. PATENT DOCUMENTS

| 2,051,488 | 8/1938 | Kottlowski et al | 74/242.11 R |
| 2,818,311 | 12/1957 | Ashley, Jr. | 74/242.1 FP |

FOREIGN PATENT DOCUMENTS 2,144,688  3/1973  Germany ...................... 74/242.1 FP

*Primary Examiner*—Leonard H. Gerin
*Attorney, Agent, or Firm*—Haseltine, Lake & Waters

[57] ABSTRACT

In an internal combustion engine having a timing system which employs a crenellated or toothed timing belt and the lubrication is carried out under a substantial oil pressure, a device for maintaining the tension of said belt as close as possible to the initial calibration value, said device comprising the combination of two resilient members acting the said means being responsive to the pressure of the lubricating oil with the intermediary of a piston moved by the pressure of said oil. Thus, the belt tension is rendered insensitive to the size variations the engine undergoes as its temperature is changed, e.g. when the engine passes from standstill to running and vice versa.

6 Claims, 4 Drawing Figures

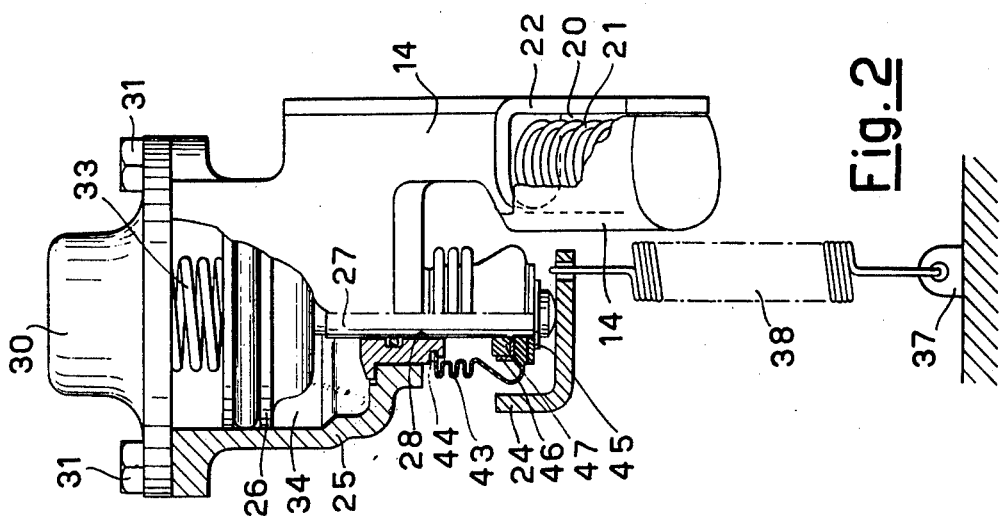
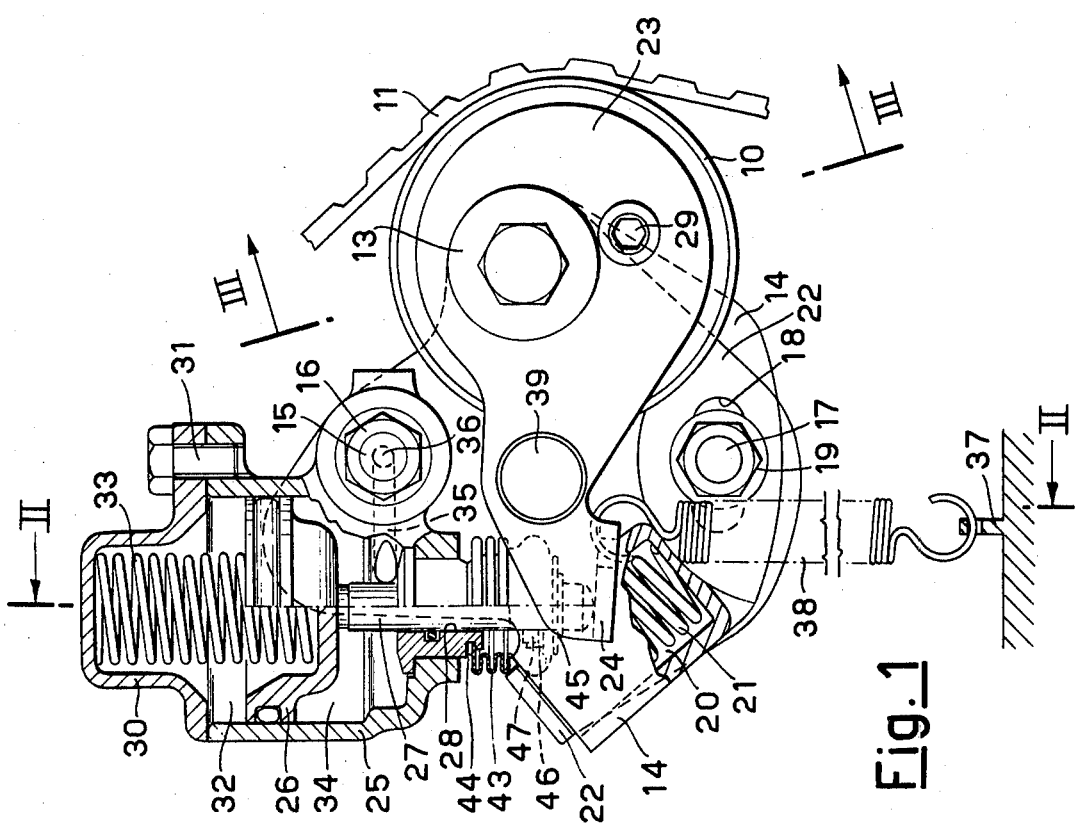

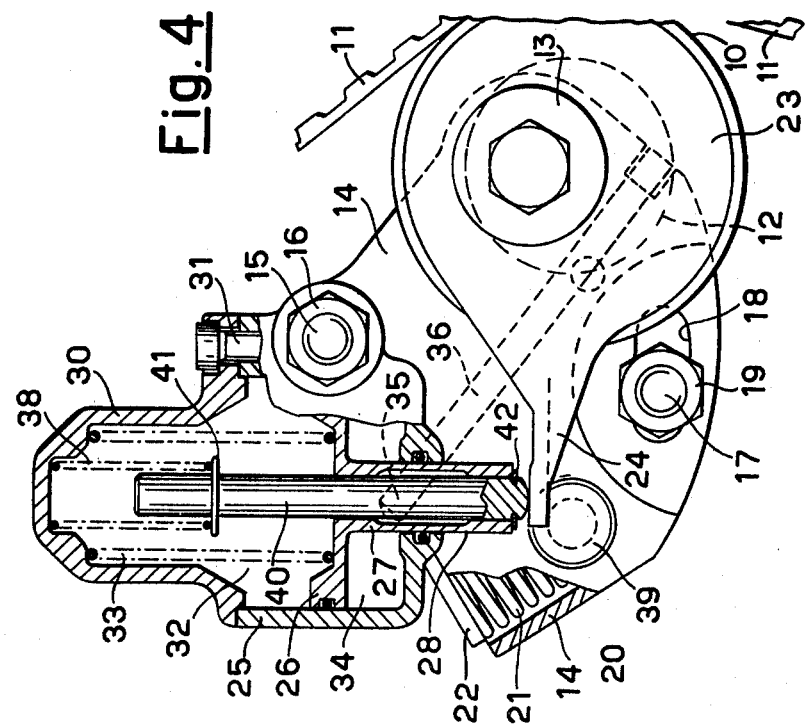
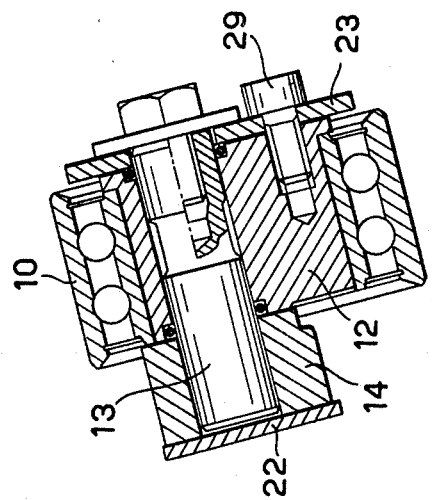

DEVICE FOR THE AUTOMATIC REGULATION OF THE TENSION OF A CRENELLATED TIMING BELT

BACKGROUND OF THE INVENTION

This invention relates to a device for the automatic regulation of the position of a belt-tightening roller, during the operation of an internal combustion engine, said device being adapted to prevent the tension of the belt from undergoing any alteration relative to the value which was selected with the initial calibration due to the variations of the distance between the axes of the toothed pulleys which are integrally keyed to the timing shafts and the driving shaft, respectively, as caused by expansions and contractions of the engine block.

The toothed belts as employed in transferring the drive from the driving shaft to the timing mechanism shafts are generally so constructed (with a core of glass fiber or of a spirally wound steel wire) that, after an initial settling elongation which is the result of a plastic deformation, are virtually indeformable and unextensible, whereas the engine block and the engine head, especially, when they are made of a lightweight alloy, that is a material which is characterized by a high expansion coefficient, such as for example aluminum, undergo considerable expansions and contractions due to the effect of temperature differentials to which they are subjected during the engine operation and during the cooling thereof which is a result of the engine stoppage, especially when the ambient temperature is extremely low. Due to the variations of the distances between the axles, modifications are experienced, which are even most significant, in the initial belt tension, so that troubles in operation can be experienced in the operation of the belt and the engine performance could even be negatively influenced.

As the tension is increased, the operation of the belt becomes much more noisy and, while at the high rpm's of the engine the noise caused by a belt which operates incorrectly can be exchanged for other noises as originated by the engine and the several moving members, at the low rpm's such a noise is discretely perceptible relative to other noises, the latter being dampened to a degree under such conditions.

The increased noise due to the increase of the belt tension is presumably due to the fact that the meshing between the belt teeth and the pulley teeth takes place with more abrupt bumps, but also to the fact that during the approaching stage the air is ejected rapidly and completely from the inter-tooth cavities, since the sides of the 'belt teeth forcibly stick to the sides of the pulley teeth, whereas, during the detachment stage, an abrupt air draw is experienced towards the intertooth hollows. The latter speculation seems to have been corroborated by the fact that the incorrect operation of the belt is accompanied by a swishing sound which can neatly be distinguished among the other noises of the mechanical component parts.

A decrease of the belt tension is as much detrimental even though due to different reasons. The belt stays slacking on the pulleys and backlashes can be originated between the belt teeth and the pulley teeth, which can give rise to a tooth skip, especially when the engine is started. The phase change of the timing shafts is a result, relative to the driving shaft, with a serious jeopardy for the correct engine operation.

With the chain transfer mechanisms, a problem arises, which, under a few aspects, is akin to that which has been outlined hereinabove in connection with the toothed belt transfer mechanisms. During the engine service life, the chain becomes elongated due to the effect of stresses which originate permanent deformations, so that the chain tension shows a tendency towards being diminished relative to its initial magnitude.

In order to maintain a chain at the designed pull, devices are generally employed, which are generally composed by a pad kept into contact with the driving lap of the chain by specially provided mechanical or hydraulic actuators. Every time that a backlash takes place between the pad and the chain due to the effect of an elongation of the latter, the pad is brought back to contact the chain so as to restore the initial tension again.

These devices, however, are of the unidirectional action type, in the sense that they adjust the chain tension only in the case that the chain is slackened. The pad, then, remains latched in its outermost position until a subsequent action is taken.

SUMMARY OF THE INVENTION

The present device has thus been designed for adjusting the belt tension under the different conditions of use of the engine, and is capable either of taking up the possible tension increases which are experienced under hot conditions due to the expansion of the engine block, or the tension decreases which are experienced under cold conditions due to shrinking of the engine block. Thus, it becomes possible to maintain the belt tension within the interval of the values which had been established with the initial calibration. The device of the invention thus forestalls the intense tension increases, as well and the exceeding intense tension decreases, which are very likely to occur due to variations of the mutual distances between the axles of the shafts which are drivingly connected by the belt, the more so that the belt, due to its lack of resiliency, is incapable of becoming either stretched or shortened to the extent which would be desirable as a consequence of the variations of the distances between the axes.

In the internal combustion engines the toothed timing belt is mounted as partially wrapping (with a certain wrapping angle) about a toothed driving pulley which is integral with the driving shaft and on at least one driven toothed pulley which is integral with a timing shaft, and, moreover, it is wound, on its idle lap, or driven lap, about a belt-tightening roller the position of which is adjusted when the belt is installed so as to provide a certain belt tension.

The device according to the present invention is active in the sense of automatically changing the position of the belt-tightening roller whenever an increase, or a reduction, of the belt tension is experienced. The device causes the angle of wrap of the belt on the tightening roller to be varied, and, concurrently, the maximum sag of the driven belt lap is varied. The sag is reduced, or increased over the initial value according to the direction of variation of the tension, so that the same tension takes in any case a value which is close to that of the initial calibration.

The device according to the invention comprises a belt-tightening member which is resiliently urged against the belt driven lap, characterized in that said member is concurrently urged by a first resilient means and by a second resilient means, the second resilient means being opposed by a piston which is movable in the interior of a chamber which communicates with the lubrication circuit of the engine.

The device according to the invention affords a twofold advantage: it prevents, under hot conditions, the production of exceedingly high overtensions of the toothed belt and removes the consequent annoying noise of the transmission; it prevents the belt from being stretched under cold conditions while preventing the consequent tooth skip on the toothed pulley as the engine is to be started again.

IN THE DRAWINGS

Features and advantages of the invention can be better understoody by examining the accompanying drawings, which show, by way of nonlimiting examples, the preferred embodiments of the device. In the drawings:

FIG. 1 is a view, partly in section and partly fragmentary, of a first embodiment of the invention.

FIG. 2 is a cross-sectional view taken along the line II—II of FIG. 1.

FIG. 3 is a cross-sectional view taken along the line III—III of FIG. 1, and

FIG. 4 is a view similar to FIG. 1, showing an alternative embodiment of the invention.

PREFERRED EMBODIMENT OF THE INVENTION

In FIGS. 1, 2 and 3 there are indicated at 10 the belt-tightening roller and, at 11, a portion of the idle lap of the belt, which is wrapped around the roller. At 12 there is indicated a first pin on which a roller 10 is idly mounted, as composed by an outer cylinder of a bearing having a twin ball row and there is shown at 13 a second pin on which a pin 12 is idly mounted in an eccentrical position. To the outermost end of the pin 12 there is, fastened by the screw 29, a disc 23 to which an arm 24 is affixed, which is extended along a direction which is substantially perpendicular to the axis of said disc. The numeral 38 indicates a spring which is fastened to an end of the arm 24 and is affixed at the other end to the engine baseplate at 37. The numeral 14 indicates a supporting base to which the pin 13 is integrally fastened.

The supporting base 14 is fastened to the engine baseplate (not shown) by the stud bolt 15 and the respective nut 16 and, by the stud bolt 17, passed through the slot 18 of the same plate, and the respective nut 19. In the base 14 a housing 20 is formed for a spring 21 which biases a bracket 22, the latter being obtained from a plate inserted between the supporting base 14 and the engine block.

To the base 14 there is solidly affixed a cylindrical body 25 which houses a piston 26. The latter has a stem 27 which slides, in sealtight manner in the bore 28 as formed through the bottom wall of the cylindrical body 25. On the top, the cylindrical body is closed by a lid or cup 30, which is connected to the same cylindrical body by screws, one of which, indicated at 31, can be seen in FIG. 1. In the top hollow space 32 of the cylindrical body 25 a spring is received, which is shown at 33, and which impresses to the piston 26 a force tending to thrust the latter downwardly to contact the arm 24. The lower hollow space 34 of the cylindrical body is connected to the lubrication circuit of the engine via the ducts 35 and 36 which are formed through the base 14. Oil flows into the hollow space 34 when the engine is running and rapidly attains a pressure which is sufficient to exert on the piston 26 a force which is capable of annuling the bias of the spring 33.

At 43 there is shown a bellows 43 which is integral at 44 with the bottom wall of the cylindrical body 25 and is fastened by the Seeger ring 45 to the stem 27 of the piston 26. To the bellows 43 is solidly affixed, through the cup 46, a sealing ring 47.

Upon the installation, the engine being at room temperature, the arm 24 is affixed to the baseplate 14 by the pin 39 so that the pin 12 of the tightening roller 10 is made solid with the base 14 and the device for adjusting the belt tension automatically is off. It is thus possible to carry out the initial calibration of the belt pull by displacing the supporting base 14, and therewith, also the tightening roller relative to the belt 11. Once the nuts 16 and 19 have been released, the base 14 is allowed to be rotated about the stud bolt 15, as guided by the stud bolt 17 as inserted in the slot 18, so that the base can be displaced up to the position at which the desired belt tension is obtained. The tension is then set by tightening the nuts 16 and 19.

The spring 21 which is rather pliable and is thus capable of impressing a sufficiently constant load, makes the calibration of the belt pull more accurate and quicker, since it prevents this operation from being exclusively entrusted to the manual action of an operator.

After the initial calibration operation of the belt tension, the device for the automatic adjustment of the belt tension is made active again by withdrawing the pin 39, so that the pin 12 is again free to be rotated about the pin 13.

As soon as the engine begins to run, the oil under pressure as fed by the engine lubrication circuit reaches the chamber 34 and impresses to the piston 26 a force which overcomes the bias of the spring 33. The piston is lifted and the stem 27 of the piston is cleared of the arm 24, the latter being thus released of the bias of the spring 33.

During the engine operation the arm 24 is thus subjected to the action of the spring 38 only, the latter generating, relative to the pin 13 on which the pin 12 is eccentrically mounted, a moment of rotation which balances the moment of rotation, acting upon the same pin 12, which is due to the resultant of the radial components of the forces acting on the periphery of the tightening roller 10 by virtue of the tension of the belt 11. The resultant of these forces, and thus their torque, vary as the tension of the belt 11 is varied. As the belt pull is increased due to the effect of expansions of the engine block, the resultant of these forces overcomes that due to the bias of the spring 38, and causes the pin 12 to be rotated clockwise relative to the eccentric pin 13. As a result of the rotation of the pin 12 clockwise, the tightening roller 10 is pushed back relative to the belt 11 and the belt tension is reduced to the value at which a novel equilibrium is established between the moment of the resultant of the forces due to the same belt tension and the moment due to the bias of the spring 38.

With the device as described hereinabove intense overtension of the belt are prevented with the attendant operation troubles, which would be experimented with a hot engine, with a lightweight alloy engine block, due to the expansion of the same engine block and the ensuing increase of the mutual distances between the axes of the toothed pulleys of the main shaft and the timing shafts.

As the engine is stopped, oil emerges from the space 34 and the piston 26 is urged towards its end of stroke against the bottom wall of the cylindrical body 25, by the bias of the spring 33. Through the stem 27, the spring 33 imparts to the arm 24 an action which is added to that of the spring 38 and urges also the pin 12 towards the end of the stroke, the pin having thoroughly been rotated in the anticlockwise direction.

The belt tension, which would tend to be decreased by the effect of the shrinking of the engine block due to cooling thereof, is maintained at a value which is at least close to the initial calibration value, since under these conditions the tightening roller is driven to be advanced towards the belt and keep the latter constantly taut.

The spring 33, which acts upon the arm 24 only when the engine is not running since the contrasting force imparted by the oil under pressure to the piston 26 is lacking, acts upon the same arm 24 with a force which is stronger than that of the spring 38, so that, once the engine has been stopped, the pin 12 is actually pushed to its end of stroke. As a matter of fact, due to the effect of the frictional forces and the unfavorable instantaneous position as taken by the timing camshafts as the engine is stopped, a comparatively strong force is required to push the pin 12 and the tightening roller 10 towards the end of stroke position.

Inasmuch as the return to the end of stroke of the tightening roller is warranted, the device has the advantage that the belt is held taut in spite of the very low ambient temperature when due to the considerable shrinking of the engine block and the decrease of the distance between the shafts entailed thereby, the belt tension could even be reduced to nil.

Under such conditions, the device is capable of maintaining the belt tension, if not exactly to the value as set by the initial calibration, at least to a level which is sufficient to afford a correct drive transfer from the mainshaft to the timing shafts, thus preventing the drawback that, due to an exceedingly high slackening of the belt, a tooth-skip may take place as the engine is started and the fractional forces are to be overcome.

FIG. 4 shows a modification of the device shown in the previous Figures of the drawings, equal component parts being indicated by equal reference numerals.

In this version of the device, the piston 26 is fitted with a hollow stem 27' in which a slidable arbor 40 is inserted: the latter is maintained in engagement with the arm 24 by the spring 38' which is inserted between the plate 41 integral with the same arbor and the lid 30 of the cylindrical body 25. The arbor 40 is fitted with a Seeger ring 42 which enables the stem 27' of the piston 26 to become engaged with said arbor, and to draw the latter together in the downward motion of the piston itself.

In this version of the device, the spring 38 has been dispensed with and a spring 38' is used in replacement therefor, which, through the arbor 40, impresses a similar force to the arm 24.

The operation of the device is very much the same as that which has been described hereinabove. When the engine is stationary, since the oil under pressure does not fill the hollow space 34, the spring 33 urges the piston 26 towards its end of stroke against the bottom wall of the cylindrical body 25 and the hollow stem 27' of the piston draws, with the intermediary of the Seeger ring 42, the arbor 40 so that the pin 12 and the tightening roller 10 are pushed towards the end of stroke by the concurrent action of the springs 33 and 38'.

As the engine is running, also in this case, the oil under pressure which reaches the hollow space 34, imparts to the piston 26 a force which nullifies the bias of the spring 33 which is contrary thereto, and causes the piston 26 to be lifted, so that the arm 24 is subjected with the intermediary of the arbor 40, to the bias of the spring 38' only.

Also in this case, as the temperature of the engine block is increased, the tightening roller is pushed back relative to the belt since the pin 12 is caused to be rotated about the eccentric axis of the pin 13 and takes, every time, the position at which the moment of the resultant of the forces acting upon the roller 10 due to the effect of the belt tension is balanced by the moment which is due to the bias of the spring 38'.

Many modifications and variations of the present invention are possible in light of the above teachings. It is, therefore, to be understood that within the scope of the appended claims, the invention may be practiced otherwise than as particularly described.

What I claim is:

1. A device for the automatic regulation of the pull of a toothed timing belt mounted on pulleys of an internal combustion engine equipped with a forced-lubrication circuit, comprising a belt-tightening member defined by a roller mounted for rotation on a pin which is eccentrically borne by a member which is integral with a supporting element affixed to an engine block of said engine, said pin having a radial extension on which resilient means are active characterized in that the member is pushed concurrently by a first resilient means and by a second resilient means, a piston, movable within a chamber communicating with the engine lubrication circuit, acting against said first resilient means.

2. A device according to claim 1, characterized in that the first resilient means is a spring acting on the surface of the piston which is away of the face which confronts said chamber.

3. A device according to claim 2 characterized in that said second resilient means is a spring which urges a stem against said radial extension, on said stem being slidably mounted on the piston, the stroke of which relative to the stem is restricted by an abutment on said stem, against which the piston abut as it is urged by the spring which is said first resilient means.

4. A device according to claim 1, characterized in that the stem of said piston is hollow and in its interior a slidable arbor is received, said arbor being driven by said second resilient means so as to become engaged with the arm integral with said first pin, the arbor being equipped with binding means by which the piston stem is made integral with the same arbor by the agency of said first resilient means as the engine is stopped, when the fluid pressure in the second chamber of the cylindrical body is annulled.

5. A device for the automatic regulation of the pull of a crenellated timing belt of an internal combustion engine, the belt being partially wrapped around a driving crenellated pulley integral with the engine mainshaft and around at least one driven pulley integral with a timing shaft and being also partially wrapped around a belt-tightening roller in the inactive lap of said belt, the device being characterized in that it comprises a first pin on which is idly mounted the same belt-tightening roller and a second pin on which the first pin is eccentrically mounted for idle rotation thereon, said second pin being solid with a supporting element fastened to the engine block by means adapted to adjust the initial position of the belt-tightening roller consistently with the pull to be impressed to the belt, to said supporting element a cylindrical body being fastened in which a piston is allowed to slide to a sealtight manner, the piston having integral therewith a stem which passes through one of the bottom walls of the cylindrical body, the cylindrical body being partitioned by the piston into two chambers, the first chamber receiving first resilient means in engagement with the piston, the second chamber being in communication with a source of fluid which, during the operation of the engine is brought to a preselected pressure magnitude capable of generating on the piston a force which annuls the action of said first resilient means, said first pin having integral therewith an arm on which second resilient means are active which tend to rotate the same pin about the eccentric axis of the second pin and to push the belt-tightening roller against the crenellated belt so that, as the belt pull is increased due to the effect of expansions of the engine block, the first pin takes at every instant of time the angular position which is arreared relative to the belt and in which there is an equilibrium between the moment of the forces acting on the surface of the tightening roller due to the effect of the belt pull and the moment due to the action of said second resilient means, so that the belt pull takes a value close to that of the initial calibration, the device being such that at the instant at which the engine is stopped, since the fluid pressure in the second chamber of the cylindrical body is annulled, the stem of the piston is driven by said first resilient means to become engaged with the arm of the first pin and exerts on said pin an action which is added to that of said second resilient means so as to rotate the first pin aforesaid about the eccentric axis of the second pin and push the tightening roller against the crenellated belt so that, as the engine block is shrunk due to cooling, the belt pull takes a value which is close to the value as set with the initial calibration.

6. A device for the automatic regulation of the tension of a toothed timing belt mounted on pulleys of an internal combustion engine, comprising: a belt-tightening member and first and second resilient means having respectively different force capabilities, said resilient means concurrently act on said member to resiliently urge the same member against a driven lap of the belt; said first resilient means having such a force as to maintain a predetermined tension of the belt when the engine is stopped and having associated therewith, a piston movable within a chamber communicating with a fluid source which during operation of the engine is brought to a preselected pressure magnitude capable of generating on the piston a force which annuls the action of said first resilient means on the belt-tightening member, and said second resilient means being of a reduced force capability, interposed between said member and a stationary reaction point, to maintain a constant tension of the belt during operation of the engine.

* * * * *